United States Patent [19]
Furusawa et al.

[11] 4,270,838
[45] Jun. 2, 1981

[54] MICROMANIPULATOR FOR A MICROSCOPE

[75] Inventors: Mitsuru Furusawa, Nishinomiya; Fumiichiro Yamamoto, Osaka; Makoto Yoshinaga, Hachioji, all of Japan

[73] Assignee: Olympus Optical Co., Ltd., Tokyo, Japan

[21] Appl. No.: 38,715

[22] Filed: May 14, 1979

[30] Foreign Application Priority Data

Jun. 5, 1978 [JP] Japan ............................ 53/67461

[51] Int. Cl.³ .............................................. G02B 21/32
[52] U.S. Cl. ..................................................... 350/81
[58] Field of Search .............................. 350/81, 86–89

[56] References Cited

U.S. PATENT DOCUMENTS

| | | | |
|---|---|---|---|
| 3,661,316 | 5/1972 | Kulicke et al. | 350/81 |
| 3,765,744 | 10/1973 | Van Noord et al. | 350/81 |

FOREIGN PATENT DOCUMENTS

242042 of 1970 U.S.S.R. .................................. 350/81

OTHER PUBLICATIONS

Alameddine et al., "IBM Tech. Dis. Bull.", vol. 15, No. 1, Jun. 1972, p. 7.
"Micropower", Hacker Inst. Advertisement, Nov. 1972.
Japan Patent App. Pub. No. Sho-53/22980, Mar. 1978.
Chambers, Robert, Jour. of Bact., "A Micromanipulator For . . .", Jan. 1923, pp. 1–5.

*Primary Examiner*—Jon W. Henry
*Attorney, Agent, or Firm*—Weinstein & Sutton

[57] ABSTRACT

A micromanipulator comprises a miniature operating tool such as a needle, micro-pippet, micro-electrode or the like which is disposed on a movable member of a microscope, such as an illuminating condenser lens, which is movable in the direction of the optical axis of an objective lens.

5 Claims, 3 Drawing Figures

MICROMANIPULATOR FOR A MICROSCOPE

BACKGROUND OF THE INVENTION

The invention relates to a micromanipulator, and more particularly, to a micromanipulator which enables a micromanipulation function of a microscope.

Current research of living cells in the medical and biological fields requires a micro-technique or micromanipulation such as a movement, transfer or shift on the order of several microns for various purposes such as removal of a nucleus from a cell, plantation of intracell structure, minute injection of enzyme or medicine into cells, or the determination of an electrical resistance of protoplasm. Other applications of a micromanipulation include the determination of the electrical conductivity of a metal crystal, the determination of elasticity of synthetic and natural fibres, assembly of very small mechanical parts, the manufacturing of large scale integrated circuits, the preparation of specimens for examination under microscope, and the isolation of rare elements such as plutonium.

Micromanipulation takes place by using a micromanipulator which includes a gearing and hydraulic assembly to convert a relatively coarse movement by hand into a minute movement. A miniature operating tool such as a miniature needle, micro-pippet, micro-electrode is attached to the manipulator, which is then operated to displace the miniature operating tool through a very small incremental distance so that the free end of a micro-pippet, for example, may be pierced into a cell to withdraw the nucleus thereof.

A conventional micromanipulator 1 is illustrated in FIG. 1. As shown, it comprises a stationary base 2 carrying an upstanding stanchion 3 on which a support member 4 is mounted. An angular position adjusting member 5 is secured to the support member 4 by means of an adjusting screw 4a, and fixedly carries a Z-axis translational member 6 which in turn fixedly carries a Y-axis translational member 7. An X-axis translational member 8 is mounted on the member 7. It is to be understood that each of the members 6 to 8 are capable of sliding movement relative to each other by an arrangement including a dovetail and dovetail groove combination and a rack and pinion combination. Operating knobs 5a, 6a, 7a are connected with these pinions to cause a rotation thereof so that the members 6, 7, 8 can be displaced in the directions of Z- Y- and X-axis. By choosing a suitable gear ratio between the racks and pinions or by using intermediate gears, a movement by hand which rotates the operating knobs 5a to 7a can be converted into a movement of the members 6 to 8 on the order of several microns. A mounting member 9 is fixedly mounted on the X-axis translational member 8, and a miniature operating tool 10 such as a needle, micro-pippet or miniature electrode is attached to the mounting member 9.

In operation, a specimen 12 such as cells is placed on a schale 11 or glass plate, which is then located centrally on a stage 14 of microscope 13. By adjusting a focussing knob 16 while viewing through an eyepiece 15, a lens barrel 18 including an objective lens 17 is moved vertically to bring a desired cell contained in the specimen 12 into the field of sight of the objective lens and to focus the latter thereon while simultaneously moving the schale 11. If required, a condenser 19 mounted on the stage 14 may be adjusted to control the brightness within the field of sight. Subsequently, the micromanipulator 1 is placed on a table 20 on which the microscope 13 is located so that the free end of the miniature operating tool 10 is located close to the specimen 12. If required, the screw 4a may be turned to adjust the angle of inclination of the tool 10. The knobs 5a to 7a are then turned to displace the tool 10 through minimal incremental distances in X, Y and Z-axis directions, respectively, to pierce the free end into a desired cell, thus effecting a micromanipulation.

With the conventional micromanipulator 1 described above, it is disposed outside the microscope 13, so that a microscope of the type which is fixedly mounted on a stage is preferred in that the elevation of the specimen 12 is fixed. However, the recent trend of microscopes which are used for biological purposes is toward that type having a fixed length of mechanical lens barrel and in which the focussing is achieved by vertically moving the stage. When the conventional micromanipulator is used in combination with the microscope of the type having a vertically movable stage, the stage must be moved vertically as is the location of specimen each time a focussing operation of the microscope takes place. Hence, in order to pierce the free end of the tool 10 into a desired cell, it is necessary to operate three knobs 5a to 7a to bring the free end of the tool 10 progressively closer to the cell while focussing the objective lens alternately on the free end of the tool 10 and the desired cell, by turning the focussing knob. In the process, it is to be noted that the miniature operating tool 10 is brought into the field of sight of the objective lens in an oblique direction which is close to the horizontal in order to avoid the interference of the tool 10 with the objective lens. This means that the X, Y and Z-axis along which the tool 10 is moved by operating the knobs 5a to 7a are different from the vertical direction, one horizontal direction and another horizontal direction which is perpendicular thereto. Thus, it becomes necessary to operate at least more than one knobs in order to move the free end of the tool 10 vertically relative to the specimen. Hence, a high degree of skill is required to pierce the free end of the tool 10 into a desired cell. Even a skilled operator is only capable of piercing into the order of 500 cells at most in one hour, for example.

The described disadvantage of using the manipulator with the microscope having a vertically movable stage can be overcome by placing the micromanipulator directly on the stage of the microscope. In actuality, a micromanipulator which may be placed on the stage is offered on the market. However the micromanipulator must be reduced in size to degrade the operating ease because of the requirements that the manipulator can be placed on the stage, the free end of the tool 10 can be pierced into a specimen and that no interference with a rotation of the revolver when the objective lens is mounted is avoided.

Even if a microscope having a fixed stage is used or micromanipulator is placed on the stage, there remains the disadvantage that the X-, Y- and Z-axes along which the tool 10 is moved are different from the vertical direction, and two mutually perpendicular horizontal directions as viewed through the microscope, thus requiring three knobs to be operated. Since the tool 10 must be introduced into the field of sight along a direction which is close to the horizontal, specimen 12 must be placed on flat schale 11 or a glass plate, which causes a rapid evaporation of moisture contained in the specimen 12, which is dried up in a short period of time to destroy the cells contained therein.

SUMMARY OF THE INVENTION

It is an object of the invention to provide a novel micromanipulator comprising a miniature operating tool which is mounted on a member of a microscope that is movable in the direction of the optical axis of the objective lens of the microscope.

As mentioned previously, a majority of microscopes which are used for biological purposes comprise a stage for placement of a specimen thereon which is vertically movable in the direction of the optical axis of the objective lens. An illuminating condenser is integrally connected with the stage. Consequently, the condenser is moved vertically along the optical axis of the objective lens together with the stage. The condenser is also constructed such that it can be moved alone in the direction of the optical axis for the purpose of centering. In accordance with the invention, such condenser is utilized for mounting a miniature operating tool thereon, and hence the manipulator can be located by utilizing a centering mechanism or vertical movement mechanism associated with the condenser and which is inherently provided on the microscope. As a consequence, it is unnecessary to provide a micromanipulator which is separate from the microscope, thus dispensing with a consideration of the space for their location and containment.

The miniature operating tool which is disposed to be movable in a direction parallel to the optical axis of the objective lens of the microscope represents an economically advantageous substitute for the conventional manipulator.

In addition, the direction along which the miniature operating tool is moved has no angular or directional offset from the direction as viewed through the microscope. Thus, once the miniature operating tool is centered with the center of the field of sight, a piercing of the tool into a desired cell can be simply achieved merely by effecting a vertical movement of the condenser, thus avoiding the need to operate a plurality of operating knobs as mentioned initially.

An evaporation of the moisture from the specimen can be minimized by floating a specimen on a drop of water which is suspended in a schale that is disposed on the stage in an inverted form. This eliminates the possibility that the specimen may be dried up in a short period of time to destroy the cells contained therein, and enables an operation over a prolonged period of time. Since the miniature operating tool is mounted in alignment with the optical axis of the condenser, it has no substantial adverse influence upon the illumination or the brightness of the field of sight.

DESCRIPTION OF PREFERRED EMBODIMENTS

Figure 2:
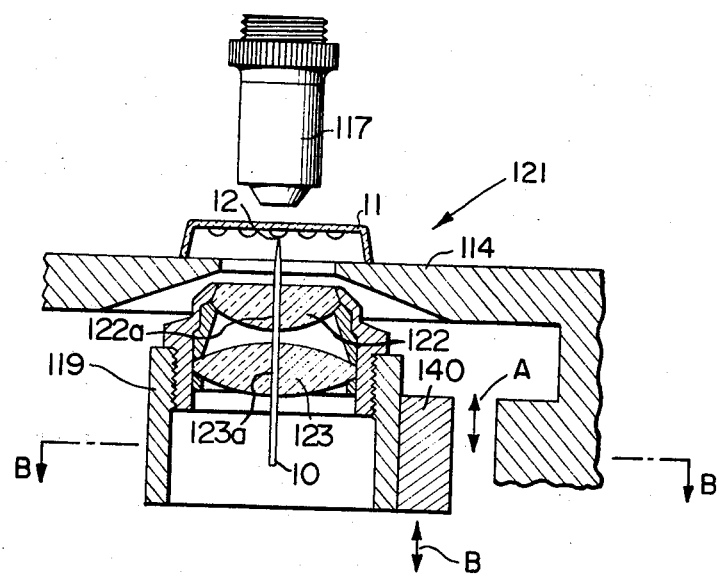
FIG. 2 is a fragmentary cross section of a micromanipulator according to one embodiment of the invention.

Referring to FIG. 2, there is shown a micromanipulator 121 according to the invention which is mounted on a lens barrel 119 associated with the condenser lens of a microscope. The barrel 119 is movable with a vertical movable stage 114 of the microscope, and is also capable of moving alone in the direction of the optical axis of an objective lens 117. The barrel 119 internally houses a pair of condenser lenses 122, 123 which are formed with openings 122a, 123a aligned with the optical axis thereof for receiving and passing a miniature operating tool 10 therethrough. The free end of the tool 10 projects beyond the upper condenser lens 122.

As shown in FIG. 2, the miniature operating tool 10 is fixed to condenser lenses 122, 123 mounted within the lens barrel 119, and the barrel 119 is fixed to a substage 140. In addition, an arm is connected to movable stage 114. As indicated by arrow A, substage 140 and tool 10 are movable with stage 114, and as indicated by arrow B, substage 140 and tool 10 are movable relative to stage 114.

The microscope includes a centering mechanism (not shown) for the lens barrel 119 which aligns the optical axis of the objective lens 119 with that of condenser lenses 122, 123. An eyepiece (not shown) with a cross mark is used, and the free end of the miniature operating tool 10 is brought into alignment with the crossing of the cross mark. Specimen 12 is made floating on a water drop in schale 11, which is then disposed centrally on the stage 114 in an inverted form. The drops are then suspended from the inner surface of schale 11, with the specimen 12 floating therein. The desired cell in the specimen 12 is brought into alignment with the crossing of the cross mark in the eyepiece by moving both schale 11 and stage 114. Subsequently, a vertical movement mechanism which adjusts the brightness of the field of sight is operated to move the lens barrel 119 upwardly. Thereupon, the miniature operating tool 10 which is disposed in the lens barrel has its free end pierced into a desired cell. Because the free end of tool 10 is previously centered on the crossing of the cross mark and a desired cell in the specimen 12 is also located on the crossing of the cross mark, it is assured that the free end of tool 10 reliably pierces into the cell. When the tool 10 comprises a micro-pippet, for example, it may be used to remove the nucleus or to inject a medicine. A microelectrode may be used to conduct a micromanipulation such as providing an electrical conduction.

Figure 3:
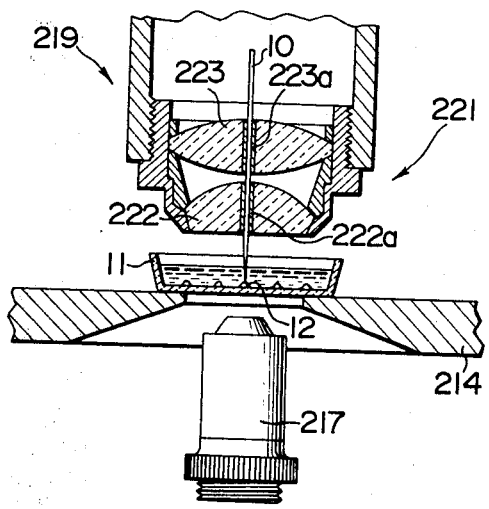
FIG. 3 is a fragmentary cross section of a micromanipulator according to another embodiment of the invention, as applied to a microscope of the inverted type.

FIG. 3 shows a micromanipulator according to another embodiment of the invention. Micromanipulator 121 shown in FIG. 2 is applied to a microscope of the erect image type while micromanipulator 221 shown in FIG. 3 is applied with a microscope of the inverted image type, and is used where a micromanipulation is required while keeping specimen 12 contained in a culture solution which is received in schale 11.

The micromanipulator 221 comprises a miniature operating tool 10 which is mounted in a lens barrel 219 associated with condenser lenses 222, 223. The lens barrel 219 is movable with a vertically movable stage 214 of the microscope as in the previous embodiment, and is also capable of moving alone in the direction of the optical axis of objective lens 217. Condenser lenses 222, 223 are formed with openings 222a 223a in alignment with its optical axis for receiving the tool 10, with the free end of the tool 10 projecting beyond the lower condenser lens 222. The micromanipulator 221 can be used in the same manner as before to cause miniature operating tool 10 to pierce into a cell contained in the specimen 12 from above, which is contained in a culture solution which received within schale 11.

It is to be noted that the invention is not limited to its use with a bright field of sight microscope as shown in the embodiments, but is equally applicable to a dark field of sight microscope as well as other microscopes such as a phase difference microscope.

In the embodiment described above, the miniature operating tool is disposed in a lens barrel associated with condenser lenses of the microscope. However, it should be understood that the miniature operating tool may be mounted on any member such as a substage, attached to the stage, which is mounted on the microscope and is movable in the direction of the optical axis of the objective lens. Instead of fixedly mounting the tool in the condenser lenses, it may be slidably passed through center openings in the lenses and moved vertically by a member which is displaced in the direction of the optical axis of the objective lens.

Figure 1:
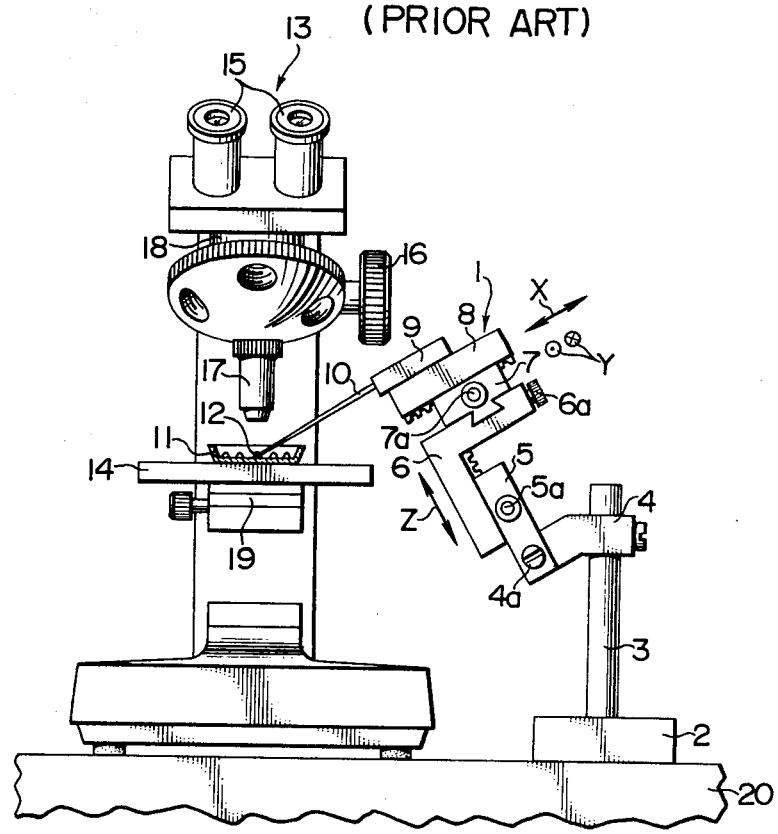
FIG. 1 is a front view of a conventional micromanipulator.
Figure 4:
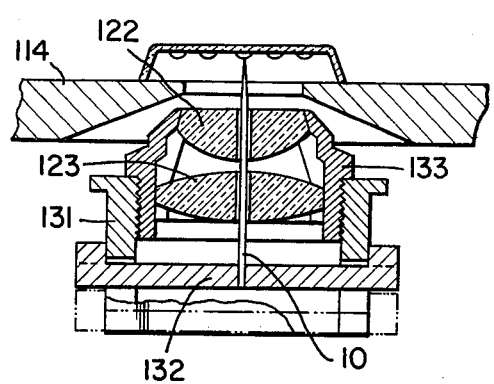
FIG. 4 is a cross-sectional view of another embodiment of the invention.

More particularly, as shown in FIG. 4, miniature operating tool 10 is vertically movable through center holes formed in condenser lenses 122, 123 and is connected to a member 132, which is slidably mounted relative to lens barrel 131. In operation, the tool 10 can be slidably moved relative to the lenses by vertically moving the member 132 relative to the lens barrel 131.

What is claimed is:

1. Apparatus including a microscope and a micromanipulator mounted thereon, comprising:
    a microscope including an objective lens having an optical axis;
    said microscope including a movable member mounted on said microscope for movement in the direction of said optical axis;
    said movable member including a lens;
    a miniature operating tool; and
    said miniature operating tool being mounted on the lens of said movable member for movement in the direction of said optical axis.

2. A micromanipulator according to claim 1 in which said miniature operating tool is fixedly mounted within an opening formed in said lens in alignment with said optical axis, with the free end of said tool projecting from said lens.

3. A micromanipulator according to claim 2 in which said lens comprises a condenser lens used for illumination of the microscope.

4. A micromanipulator according to claim 1 in which the movable member comprises a substage attached to a stage of the microscope.

5. Apparatus including a microscope and a micromanipulator mounted thereon, comprising:
    a microscope including an objective lens having an optical axis;
    said microscope including a movable member mounted on said microscope for movement in the direction of said optical axis;
    said movable member including a lens;
    a miniature operating tool; and
    said miniature operating tool being slidably disposed in an opening formed in said lens in alignment with said optical axis for movement in the direction of said optical axis.

* * * * *